United States Patent [19]

Tang et al.

[11] Patent Number: 4,742,133

[45] Date of Patent: May 3, 1988

[54] POLY(ALLYL CARBONATE)-FUNCTIONAL PREPOLYMERS PREPARED BY TREATMENT WITH MOLECULAR OXYGEN

[75] Inventors: Felicia Y. Tang; Robert H. Tang, both of Norton, Ohio

[73] Assignee: PPG Industries, Inc., Pittsburgh, Pa.

[21] Appl. No.: 779,400

[22] Filed: Sep. 24, 1985

[51] Int. Cl.$^4$ .................. G08F 4/00; C08F 118/24; C08F 218/24
[52] U.S. Cl. ................................. 526/235; 516/314
[58] Field of Search ............... 260/463; 526/314, 235; 568/569, 564

[56] References Cited

U.S. PATENT DOCUMENTS

| | | | |
|---|---|---|---|
| 2,073,619 | 3/1937 | Bauer et al. | 526/235 |
| 2,370,566 | 2/1945 | Muskat et al. | 526/314 |
| 2,545,689 | 3/1951 | Dannenberg et al. | 526/235 |
| 2,820,064 | 1/1958 | Greene, Jr. et al. | 568/569 |

FOREIGN PATENT DOCUMENTS 57-133106  8/1982  Japan .................. 526/314

Primary Examiner—Joseph L. Schofer
Assistant Examiner—Peter F. Kulkosky
Attorney, Agent, or Firm—George D. Morris

[57] ABSTRACT

A liquid monomer composition comprising of at least one poly(allyl carbonate)-functional monomer is contacted with molecular oxygen to produce a liquid intermediate composition which is then heated to produce a polymerizable, liquid substantially gel-free composition which contains poly(allyl carbonate)-funtional prepolymer which has an allylic utilization of at least about 12 percent.

18 Claims, No Drawings

POLY(ALLYL CARBONATE)-FUNCTIONAL PREPOLYMERS PREPARED BY TREATMENT WITH MOLECULAR OXYGEN

Poly(allyl carbonate)-functional monomer compositions are polymerized by free radical initiators to produce hard polymers. Many of these polymers are essentially transparent to visible light, are substantially colorless, have refractive indicies of from about 1.45 to about 1.57, and possess a 15-second Barcol hardness above about zero. For these reasons, such monomer compositions find utility as precursors for transparent coatings, optical lenses, optical lens blanks, and other optical elements, and flat or curved transparent sheets. Light transmission characteristics may be altered by incorporating dyes, light absorbing compounds, pigments, and the like, in the monomer composition before polymerization, or by dying the polymer.

One problem associated with the polymerization of poly(allyl carbonate)-functional monomer compositions is the relatively high shrinkage of the material which occurs during the course of polymerization to the final thermoset polymer. For example, there is a shrinkage of approximately 12½ percent during the polymerization of diethylene glycol bis(allyl carbonate). Such high shrinkages are particularly detrimental in casting operations such as those used to produce ophthalmic lenses and ophthalmic lens blanks, where the liquid monomer composition is introduced to a mold and thereafter polymerized to the final thermoset polymer.

Although it is not desired to be bound by any theory, it is believed that the shrinkage is primarily the result of a reduction in volume accompanying the conversion of allylic groups to units of the polymer.

It is known that shrinkage in the mold may be reduced by introducing a liquid prepolymer to the mold and thereafter polymerizing the prepolymer to the final thermoset polymer. The prepolymer is usually produced by partially polymerizing the poly(allyl carbonate)-functional monomer composition to consume a portion of the allylic groups. The partial polymerization is stopped, however, before more than a trivial amount of gellation occurs so that the prepolymer may be introduced to the mold as a liquid.

Another problem associated with the polymerization of poly(allyl carbonate)-functional monomer compositions is the presence of hydroperoxide functionality often associated, in greater or lesser amounts, with the monomer. Notwithstanding that organic peroxides and sometimes organic hydroperoxides are usually introduced to effectuate initiation of polymerization, the hydroperoxide functionality associated with the monomer usually acts as an inhibitor to polymerization. In general, the greater the hydroperoxide content of the monomer, the greater must be the amount of initiator employed in order to maintain the 15-second Barcol hardness of the polymer at an acceptably high level.

It has now surprisingly been discovered that prepolymer may be prepared by increasing the hydroperoxide content of the monomer composition and thereafter reducing the same. Accordingly, one embodiment of the invention is a method comprising (a) contacting a liquid monomer composition comprising at least one poly(allyl carbonate)-functional monomer, with molecular oxygen at a temperature of at least about 65° C. to produce a liquid intermediate composition having an increased hydroperoxide content of at least about 400 ppm, and (b) thereafter maintaining the intermediate composition at a temperature of at least about 100° C. to produce as a product a polymerizable, liquid, substantially gel-free composition which contains poly(allyl carbonate)-functional prepolymer and which has an allylic utilization of at least about 12 percent.

Poly(allyl carbonate)-functional monomers which can be utilized in the practice of the present invention are the liquid poly(allyl carbonates) of polyhydroxy organic materials. Examples of such monomers include poly(allyl carbonates) of linear or branched aliphatic polyols, poly(allyl carbonates) of cycloaliphatic-containing polyols, and poly(allyl carbonates) of aromatic-containing polyhydroxy compounds. The monomers are themselves known and can be prepared by procedures well known in the art. See, for example, U.S. Pat. Nos. 2,370,567; 2,403,113; 2,455,652; 2,455,653; 2,587,437; and 4,144,262, the disclosures of which are, in their entireties, incorporated herein by reference. In one method, the appropriate allyl alcohol is reacted with phosgene to form the corresponding alkyl chloroformate which is then reacted with the desired polyhydroxy organic material. In another method the polyhydroxy organic material is reacted with phosgene to form organic bischloroformate which is then reacted with the appropriate allyl alcohol. In a third method, the polyhydroxy organic material, the appropriate allyl alcohol, and phosgene are mixed together and reacted. In all of these reactions the proportions of reactants are approximately stoichiometric, except that phosgene may be used in substantial excess if desired. The temperatures of the chloroformate-forming reactions are preferably below about 100° C. in order to minimize the formation of undesirable by-products. Ordinarily the chloroformate-forming reaction is in the range of from about 0° C. to about 20° C. The carbonate-forming reaction is usually conducted at about the same temperatures, although higher temperatures may be employed. Suitable acid acceptors, e.g., pyridine, a tertiary amine, an alkali metal hydroxide, or an alkaline earth metal hydroxide may be employed when desired.

The poly(allyl carbonate)-functional monomers can be represented by the formula

wherein $R_1$ is the group derived from the unsaturated alcohol and is an allyl or substituted allyl group, $R_2$ is the organo group derived from the polyhydroxy organic material, and the average value of n is in the range of from about 2 to about 5, preferably about 2. For any particular compound the value of n is an integer. For mixtures of compounds, however, the average value of n may be a whole or a fractional number. The average value of n is based on the number average molecular weight of the poly(allyl carbonate)-functional monomer species constituting the mixture. The allyl group ($R_1$) can be substituted at the 2-position with a halogen, most notably chlorine or bromine, or an alkyl group containing from 1 to about 4 carbon atoms, generally a methyl or ethyl group. The $R_1$ group can be represented by the formula:

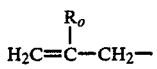
(II)

wherein $R_o$ is hydrogen, halo, or an alkyl group containing from 1 to about 4 carbon atoms. Specific examples of $R_1$ include the groups: allyl, 2-chloroallyl, 2-bromoallyl, 2-fluoroallyl, 2-methallyl, 2-ethylallyl, 2-isopropylallyl, 2-n-propylallyl, and 2-n-butylallyl. Most commonly, $R_1$ is the allyl group, $H_2C=CH—CH_2—$.

$R_2$ is a polyvalent group derived from the polyhydroxy organic material, which can be an aliphatic polyol or a polyhydroxy-functional aromatic-containing compound that contains 2, 3, 4, or 5 hydroxy groups. Typically, the polyhydroxy organic material contains 2 hydroxy groups, as for example, a glycol or bisphenol. The aliphatic polyol can be linear or branched and contain from 2 to about 10 carbon atoms. Commonly, the aliphatic polyol is an alkylene glycol having from 2 to 4 carbon atoms or a poly($C_2$-$C_4$) alkylene glycol, as for example, ethylene glycol, propylene glycol, trimethylene glycol, tetramethylene glycol, or diethylene glycol, triethylene glycol, etc.

One class of polyhydroxy-functional aromatic-containing aromatic-containing compounds can be represented by the formula:

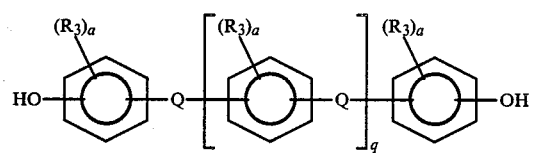
(III)

in which each $R_3$ is independently alkyl containing from 1 to about 4 carbon atoms, phenyl, or halo; the value of each a is independently in the range of from 0 to 4; each Q is independently oxy, sulfonyl, alkanediyl having from 2 to about 4 carbon atoms, or alkylidene having from 1 to about 4 carbon atoms; and the value of q is in the range of from 0 to about 3. Preferably Q is 1-methylethylidene, viz., isopropylidene.

Preferably the value of q is zero, in which case a sub-class is represented by the formula:

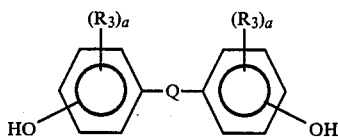
(IV)

in which each $R_3$, each a, and Q are as discussed in respect of Formula III. Preferably the two hydroxyl groups are both in the ortho or para positions. The para positions are especially preferred.

The preferred polyhydroxy-functional aromatic-containing compound is represented by the formula

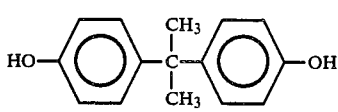
(V)

The polyhydroxy organic material from which $R_2$ is derived may also be polyhydroxy-functional chain extended compounds. Examples of such compounds based on alkylene oxide extension include ethylene oxide extended trimethylolpropane, propylene oxide extended trimethylolpropane, ethylene oxide extended glycerol, and propylene oxide extended glycerol. Additional examples include ethylene oxide extended bisphenols such as those represented by the formula:

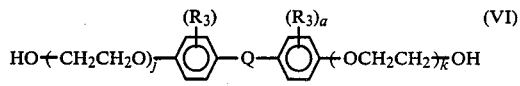
(VI)

where Q, $R_3$, and a are as discussed above in respect of Formula III, and j and k are each independently 1, 2, 3, or 4. Many compounds based on lactone extension are described in U.S. Pat. No. 3,169,945, the entire disclosure of which is incorporated herein by reference.

Specific examples of the radical $R_2$ include: alkylene goups containing from 2 to 10 carbon atoms such as ethylene, ($—CH_2—CH_2—$), trimethylene, methylethylene, tetramethylene, ethylethylene, pentamethylene, hexamethylene, 2-methylhexamethylene, octamethylene, and decamethylene; alkylene ether groups such as $—CH_2—O—CH_2—$, $—CH_2CH_2—O—CH_2CH_2—$, $—CH_2—O—CH_2—CH_2—$, and $—CH_2CH_2CH_2—O—CH_2CH_2CH_2—$; alkylene polyether groups such as $—CH_2CH_2—O—CH_2CH_2—O—CH_2CH_2—$ and $—CH_2CH_2CH_2—O—CH_2CH_2CH_2—$; alkylene carbonate and alkylene ether carbonate groups such as $—CH_2CH_2—O—CO—O—CH_2CH_2—$ and $—CH_2CH_2—O—CH_2CH_2—O—CO—O—CH_2CH_2—O—CH_2CH_2—$; and 1-methylethylidenedi-4,1-phenylene. Most commonly, $R_2$ is $—CH_2CH_2—$, $—CH_2CH_2—O—CH_2CH_2—$, or $—CH_2CH_2—O—CH_2CH_2—O—CH_2CH_2—$.

Specific examples of poly(allyl carbonate)-functional monomers useful in the practice of the invention herein contemplated include ethylene glycol bis(2-chloroallyl carbonate), ethylene glycol bis(allyl carbonate), 1,4-butanediol bis(allyl carbonate), 1,5-pentanediol bis(allyl carbonate), 1,6-hexanediol bis(allyl carbonate), diethylene glycol bis(2-methallyl carbonate), diethylene glycol bis(allyl carbonate), triethylene glycol bis(allyl carbonate), propylene glycol bis(2-ethylallyl carbonate), 1,3-propanediol bis(allyl carbonate), 1,3-butanediol bis(allyl carbonate), 1,4-butanediol bis(2-bromoallyl carbonate), dipropylene glycol bis(allyl carbonate), trimethylene glycol bis(2-ethylallyl carbonate), pentamethylene glycol bis(allyl carbonate), isopropylidene bisphenol bis(allyl carbonate), oxy bisphenol bis(allyl carbonate), and sulfonyl bisphenol bis(allyl carbonate).

A preferred class of poly(allyl carbonate)-functional monomers is represented by the formula,

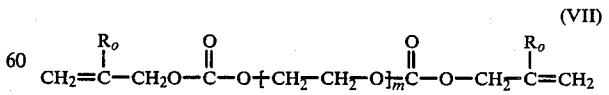
(VII)

wherein $R_o$ is hydrogen, halo or $C_1$-$C_4$ alkyl, and the average value of m is in the range of from about 1 to about 3. $R_o$ is preferably hydrogen.

Industrially important diol bis(allyl carbonate) monomers which can be utilized in the invention herein contemplated are:

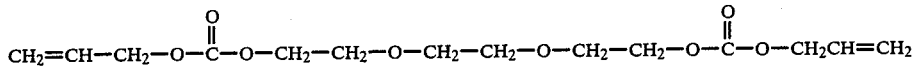

Triethylene Glycol bis(Allyl Carbonate)

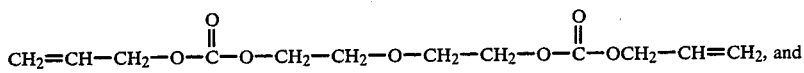

Diethylene Glycol bis(Allyl Carbonate)

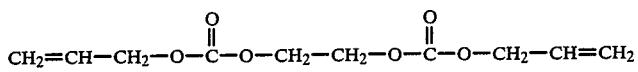

Ethylene Glycol bis(Allyl Carbonate)

Diethylene glycol bis(allyl carbonate) is preferred. This monomer is commercially available from PPG Industries, Inc. and is sold as CR-39 ® Allyl Diglycol Carbonate.

Because of the process by which the poly(allyl carbonate)-functional monomer is prepared, i.e., by phosgenation of the polyhydroxy organic material (or allyl alcohol) and subsequent esterification by the allyl alcohol (or polyhydroxy organic material), the monomer product can contain related monomer species. In the case of bis(allyl carbonate)-functional monomer, individual related monomer species can be represented by either the formula:

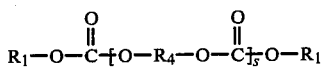

or the formula:

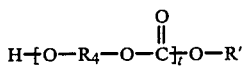

wherein $R_1$ is as defined above with respect to Formula I, each $R_4$ is independently a divalent group derived from a dihydroxy organic compound, $R'$ is $R_1$ or hydroxyl, s is a whole number from 2 to about 5 and t is a whole number from 1 to about 5. Individual related monomer species associated with diethylene glycol bis(allyl carbonate) can be represented by either the formula:

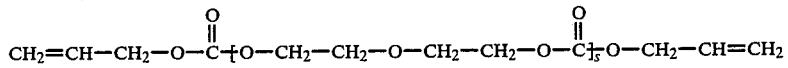

or by the formula:

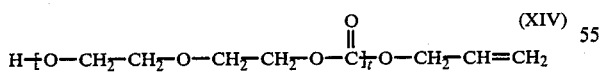

wherein s is a whole number from 2 to about 5, and t is a whole number from 1 to about 5. Analogous principles apply when the functionality of the polyhydroxy organic material is greater than two.

The poly(allyl carbonate)-functional monomer composition may be purified so as to contain essentially no related monomer species, but this is rarely done. Although the poly(allyl carbonate)-functional monomer composition may contain only a single related monomer species, it usually contains a mixture of different related monomer species. Typically all of the related monomer species taken together constitute from about 1 to about 20 weight percent of the poly(allyl carbonate)-functional monomer composition.

As used in the present description and claims, the term poly(allyl carbonate)-functional monomer or similar names, e.g., diethylene glycol bis(allyl carbonate), are intended to mean and include the named monomer and all related monomer species which may be contained therein.

The liquid poly(allyl carbonate)-functional monomer composition may be contacted with molecular oxygen by agitating the monomer composition in contact with an atmosphere of essentially pure molecular oxygen or a mixture of molecular oxygen and one or more non-reactive gases until the desired increased level of hydroperoxide content is achieved. Vigorous agitation is preferred. Such agitation may be provided by paddles, stirrers, mixers, pumps, or other similar devices.

Preferably, the liquid poly(allyl carbonate)-functional monomer composition is contacted with molecular oxygen by bubbling commercially pure molecular oxygen or a mixture of molecular oxygen and one or more non-reactive gases through the monomer composition until the desired increased level of hydroperoxide content is achieved.

The agitation of the reaction mixture provided by the rising bubbles is often sufficient, but it is preferred to employ additional agitation such as that provided by any of the devices described in the second previous paragraph.

The molecular oxygen employed may be essentially pure or it may be in admixture with one or more non-reactive gases. Examples of non-reactive gases that may be used as diluents include helium, neon, argon, krypton, xenon, nitrogen, carbon dioxide, or a mixture of two or more thereof. Most often the monomer composition is contacted with commercially pure oxygen, air, or a mixture thereof.

In order that the increased hydroperoxide content of the liquid intermediate composition may be attained in a reasonably short time, the molecular oxygen content of the gas brought into contact with the monomer composition usually contains at least about 10 percent molecular oxygen by volume. In many cases the molecular oxygen content of the gas is at least about 20 percent by volume. Preferably the molecular oxygen content is at least about 75 percent by volume.

The temperature at which the monomer composition is contacted with molecular oxygen is at least about 65° C. Usually the temperature is in the range of from about 70° C. to about 130° C. In many cases the temperature is in the range of from about 75° C. to about 100° C. Preferably the temperature is about 90° C.

The hydroperoxide content of monomer compositions intermediate monomer compositions, and prepolymer-containing compositions may be ascertained according to the following procedure: Ten milliliters of sample weighed to the nearest 0.01 gram is added to a 250 milliliter iodine flask. Twenty milliliters of 1:1 (v/v) chloroform and glacial acetic acid mixture is added to dissolve the sample, followed by small pieces of solid carbon dioxide and 2 milliliters of saturated potassium iodide solution. The flask is capped and stored in the dark for 30 minutes. Fifty milliliters of distilled water is then added and titration with standard sodium thiosulfate solution (about 0.01N) is begun with constant stirring. When the color of the liquid has become a pale yellow, one milliliter of 0.2% starch solution is added and the titration is continued until the color changes from blue to colorless. A blank is also titrated in the same manner. The parts by weight of peroxide (calculated as $H_2O_2$) per million parts by weight of sample (ppm) is ascertained from the following formula $$\text{ppm Peroxide as } H_2O_2 = \frac{(\text{Titer of Sample} - \text{Titer of Blank})(N)(17000)}{\text{Weight of Sample in grams}} \quad (XV)$$

where N is the normality of the sodium thiosulfate solution. Although the peroxide content is calculated as $H_2O_2$, for purposes of the present specification and claims, this value is taken as the hydroperoxide content.

The hydroperoxide content of the intermediate composition after being contacted with molecular oxygen may vary widely, but usually the hydroperoxide content is at least about 400 ppm. Ordinarily the hydroperoxide content is in this range of from about 400 to about 15,000 ppm. Often the hydroperoxide content is in the range of from about 600 to about 5500 ppm. Preferably the hydroperoxide content is in the range of from about 800 to about 1500 ppm.

The temperature at which the intermediate composition is maintained to produce the product is at least about 100° C. Ordinarily the temperature is in the range of from about 100° C. to about 150° C. In many cases the temperature is in the range of from about 110° C. to about 140° C. Preferably the temperature is about 130° C.

The intermediate composition may remain quiescent or it may be agitated while it is maintained at the temperature discussed above.

The allylic utilization, expressed as percent, is the percent of the allylic groups originally present in the monomer composition which have been consumed in producing the prepolymer-containing product. The allylic content of a composition may be ascertained by nuclear magnetic resonance spectroscopy and infrared spectroscopy.

The product produced by the process of the invention has an allylic utilization of at least about 12 percent. Often the product has an allylic utilization in the range of from about 12 to about 35 percent. In many cases the allylic utilization is in the range of from about 18 to about 32 percent. An allylic utilization in the range of from about 20 to about 30 percent is preferred.

The hydroperoxide content of the prepolymer-containing product is lower than in the intermediate composition. Generally the hydroperoxide content of the product is less than about 800 ppm. Often it is less than about 650 ppm. Preferably the hydroperoxide content of the product is less than about 500 ppm.

Preferably, but not necessarily, the intermediate composition is contacted with gas lean in molecular oxygen during at least a portion of the time the intermediate composition is maintained at the temperature described above to produce the product. In many cases the intermediate composition is contacted with gas lean in molecular oxygen during substantially all of the time the intermediate composition is maintained at the temperature described above to produce the product. The molecular oxygen content of this gas should be less than that of the gas employed in contacting the initial monomer composition. It is preferred that the gas contain essentially no molecular oxygen, although small amounts of molecular oxygen may be present. Ordinarily the gas lean in molecular oxygen introduced to the intermediate composition contains less than about 25 percent molecular oxygen by volume. In many cases the gas contains less than about 10 percent molecular oxygen by volume. Preferably the gas contains less than about 1 percent molecular oxygen by volume.

The agitation provided by the rising bubbles may be used without additional agitation but the use of additional agitation is preferred.

There are many materials which may optionally be present in the liquid poly(allyl carbonate)-functional monomer composition employed in the process of the invention, or which may be added to the intermediate composition before or during the practice of the second step of the process. Among these are acrylate additives which may be polyacrylate-functional monomer and/or monoacrylate-functional monomer.

The polyacrylate-functional monomers useful as the acrylate additive include those represented by the graphic formula:

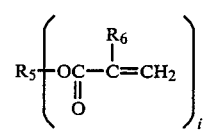
(XVI)

which is the ester of polyhydroxy organic material and an acrylic acid which may be alpha-unsubstituted or alpha-substituted, such as

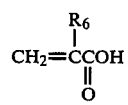
(XVII)

wherein $R_6$ is hydrogen, halo, or an alkyl group containing from 1 to about 4 carbon atoms. The average value of i is in the range of from about 2 to about 5, preferably about 2. For any particular compound the value of i is an integer. For mixtures of compounds, however, the average value of i may be a whole or a fractional number. The average value of i is based on the number average molecular weight of the polyfunctional acrylate monomer species constituting the mixture.

R₅ is a polyvalent group derived from the polyhydroxy organic material which may be the same as or different from the polyhydroxy organic material discussed above in respect of Formula II. The polyhydroxy organic material from which the R₅ group is derived can be an aliphatic polyol or a polyhydroxyfunctional aromatic-containing compound. The exemplary polyhydroxy organic materials discussed with respect to Formula II are also applicable to Formula XVI.

Preferably the polyacrylate-functional monomers are the di- or the triacrylates, more preferably the diacrylates.

Suitable triacrylates include trimethylolpropane triacrylate, trimethylolpropane trimethacrylate, glycerol triacrylate, glycerol trimethacrylate, pentaerythritol triacrylate, and pentaerythritol trimethacrylate. Suitable tetraacrylates include pentaerythritol tetraacrylate and pentaerythritol tetramethacrylate.

Diacrylate monomers are the preferred polyacrylate-functional monomers. Especially preferred are the diacrylates and dimethacrylates of aliphatic diols. Examples of such diacrylates and dimethacrylates are those represented by the graphic formulae:

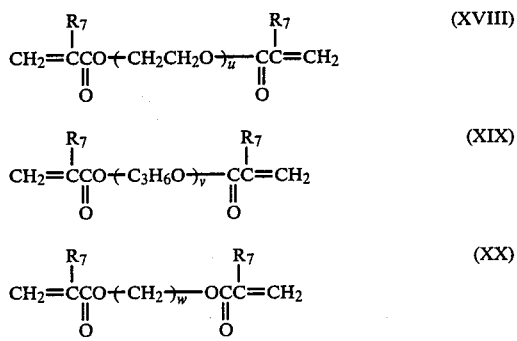

where for any particular compound each $R_7$ is individually hydrogen or methyl, u is a whole number from 1 to about 4, v is a whole number from 1 to about 4 when ($C_3H_6O$) is

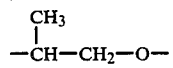

and a whole number from 1 to about 3 when ($C_3H_6O$) is —$CH_2CH_2CH_2O$—; and w is a whole number from 1 to about 12.

Examples of diacrylates include ethylene glycol diacrylate, ethylene glycol dimethacrylate, diethylene glycol diacrylate, diethylene glycol dimethacrylate, triethylene glycol diacrylate, triethylene glycol dimethacrylate, tetraethylene glycol diacrylate, tetraethylene glycol dimethacrylate, trimethylene glycol diacrylate, trimethylene glycol dimethacrylate, butanediol diacrylate, butanediol dimethacrylate, pentanediol diacrylate, pentanediol dimethacrylate, hexanediol diacrylate, hexanediol diemthacrylate, propylene glycol diacrylate, propylene glycol dimethacrylate, dipropylene glycol diacrylate, dipropylene glycol dimethacrylate, tripropylene glycol diacrylate, tripropylene glycol dimethacrylate, tetrapropylene glycol diacrylate, tetrapropylene glycol dimethacrylate, and the like.

Monoacrylate-functional monomers that can be used in the present invention are typically chosen from the group consisting of $C_1$ to $C_4$, preferably $C_1$–$C_2$ alkyl, and $C_5$–$C_6$ cycloalkyl, preferably cyclohexyl, esters of the acrylic acid of Formula XVII, most notably, acrylic acid, methacrylic acid and 2-methylenebutyric acid. Examples of monofunctional acrylates include: methyl acrylate, methyl methacrylate, ethyl methacrylate, butyl methacrylate, isobutyl methacrylate, and cyclohexyl methacrylate. The methacrylic acid esters, e.g., methyl methacrylate, are preferred.

The acrylate additive may comprise only one acrylate compound or it may comprise a plurality of acrylate compounds.

The amount of acrylate additive employed may vary widely. When it is used, it is often present in the range of from about 0.1 to about 15 percent by weight of the liquid poly(allyl carbonate)-functional monomer composition or the intermediate composition. Frequently, it is present in the range of from about 1 to about 12 percent by weight of the liquid poly(allyl carbonate)-functional monomer composition or the intermediate composition. However, the amount of the acrylate additive should be low enough that the optical and physical properties of the solid article produced by polymerizing the prepolymer-containing product composition, such as refractive index and abrasion resistance, are substantially the same as those of a polymerizate prepared from a corresponding prepolymer-containing product composition without the acrylate additive.

One or more unsaturated, non-acrylic monomers may optionally be present in the liquid poly(allyl carbonate)-functional monomer composition or in the intermediate composition. These are often chosen from the group consisting of $C_1$–$C_4$ alkyl esters of unsaturated dicarboxylic acids, vinyl esters of $C_1$ to $C_3$ saturated monocarboxylic acids and styrene. The unsaturated, non-acrylic monomers, when used, are often present in amounts of from about 0.1 to about 15, e.g., from about 1 to about 12, weight percent, basis the liquid poly(allyl carbonate)-functional monomer composition or the intermediate compositions. Examples of such monomers include: $C_1$–$C_2$ alkyl esters of unsaturated $C_4$–$C_6$ dicarboxylic acids. As the unsaturated dicarboxylic acid, there can be mentioned maleic, fumaric, itaconic, citraconic, ethylmaleic and mesaconic acids. Alcohols used to prepare the esters of the mono- and dicarboxylic acids include $C_1$–$C_4$ alkanols, e.g., methanol, ethanol, propanol, isopropanol, the butanols cyclopentanol and cyclohexanol.

Vinyl esters of lower members of monocarboxylic acids can also be used as the unsaturated, non-acrylic monomer. In particular, there are contemplated the vinyl esters of $C_1$–$C_3$ saturated monocarboxylic acids, e.g., formic, acetic and propionic acids, such as vinyl acetate.

Examples of unsaturated, non-acrylic monomers contemplated herein include: dimethyl maleate, diethyl maleate, methyl ethyl maleate, dimethyl fumarate, diethyl fumarate, methyl ethyl fumarate, vinyl acetate, vinyl formate, vinyl propionate, styrene, etc. Dimethyl maleate and dimethyl fumarate are preferred.

One or more allylic-functional materials which are not (allyl carbonate)-functional compounds (hereinafter referred to as allylic additive), may optionally be present. These include monoallylic-functional allylic additives such as for example, allylbenzene, allylcyclopentane, and allylic esters of lower monocarboxylic acids, especially the saturated monocarboxylic acids. Also included are polyallylic-functional allylic additives such as triallyl isocyanurate, triallyl cyanurate, and polyallylic functional esters of polycarboxylic acids, especially diallylic-functional esters of dicarboxylic acids; ordinarily such acids are saturated but they may be unsaturated. The amount of allylic additive present in the polymerizable composition may vary widely. When it is used, it ordinarily constitutes from about 0.1 to about 15 percent by weight of the liquid poly(allyl carbonate)-functional monomer composition or the intermediate composition.

The listing of optional ingredients discussed above is by no means exhaustive. These and other ingredients may be employed in their customary amounts for their customary purposes so long as they do not seriously interfere with the formation of the prepolymer-containing product composition.

When the liquid poly(allyl carbonate)-functional monomer composition used in the invention comprises a plurality of materials, it is usually prepared by admixing the various ingredients. Similarly, when materials are added to the intermediate composition, they may be admixed with the intermediate composition.

It has been found that the presence of a small amount of a monofunctional acrylate, such as for example, methyl methacrylate, in the intermediate composition enhances the attainment of high allylic utilizations while permitting the use of lower temperatures in the second step of the process of the invention. Preferably the monofunctional acrylate content of the liquid poly(allyl carbonate)-functional monomer composition is about 3 percent by weight.

It will be appreciated that inasmuch as a portion of the ethylenic unsaturation provided by the ethylenically unsaturated monomer or monomers is utilized in forming the poly(allyl carbonate)-functional prepolymer, such prepolymer contains segments derived from such monomer or monomers. The segment of a monomer is the portion of molecular structure contributed to the prepolymer by the monomer molecule. In most instances this is accomplished by addition polymerization of at least one ethylenic unsaturated group of the monomer molecule into the prepolymer molecule. The poly(allyl carbonate)-functional prepolymer contains segments derived from one or more of the poly(allyl carbonate)-functional monomers described above. The prepolymer may optionally also contain segments derived from at least one additional ethylenically unsaturated monomer which is devoid of (allyl carbonate)-functionality. Examples of these optional monomers are those containing, for instance, acrylyl-functionality, methacrylyl-functionality, vinyl functionality, allyl-functionality and/or 1,4-dioxo-2-butenediyl, but not (allyl carbonate)-functionality. These monomers have been exemplified above.

The prepolymer-containing product compositions produced in accordance with the invention can be polymerized (viz., cured) by the known conventional techniques for free-radically polymerizing (allyl carbonate)-containing compositions to form solid, crosslinked prepolymer.

Preferably, polymerization is accomplished by heating the polymerizable composition to elevated temperatures in the presence of free-radical initiator. The initiators which may be used may be widely varied, but in general they are thermally decomposable to produce radical pairs. One or both members of the radical pair are available to initiate addition polymerization of ethylenically unsaturated groups in the well-known manner.

The preferred initiators are peroxy initiators. Examples of suitable peroxy initiators include those represented by any of the following formulae:

wherein $R_8$ and $R_9$ are each individually phenyl, phenylalkyl in which the alkyl portion is straight or branched and contains from 1 to about 10 carbon atoms, straight alkyl containing from 1 to about 20 carbon atoms, branched alkyl containing from 3 to about 20 carbon atoms, cycloalkyl containing from about 6 to about 12 carbon atoms, or polycycloalkyl containing from about 7 to about 12 carbon atoms. The specific groups used for $R_8$ and $R_9$ may be the same or they may be different.

It is to be understood that unless otherwise qualified, either expressly or contextually, any of the above groups may be substituted with one or more minor substituents so long as their numbers and identities do not render the initiator unsuitable for its intended purpose. Halo groups, alkoxy groups containing from 1 to about 4 carbon atoms, haloalkyl groups containing from 1 to about 4 carbon atoms, and polyhaloalkyl groups containing from 1 to about 4 carbon atoms, are examples of substituents which may be used. Alkyl groups containing from 1 to about 4 carbon atoms may be used as substituents on non-aliphatic groups or on non-aliphatic portions of complex groups.

The phenylalkyl groups used for $R_8$, $R_9$, or both $R_8$ and $R_9$ often contain from 1 to about 4 carbon atoms in the alkyl portion. Benzyl and phenylethyl are preferred.

The branched alkyl groups often have at least one branch in the 1-position or the 2-position. In many cases each branched alkyl group contains from 3 to about 8 carbon atoms. Preferably, each branched alkyl group contains 3 or 5 carbon atoms.

Examples of branched alkyl groups that may be used include isopropyl secondary butyl, isobutyl, tertiary butyl, 1-methylbutyl, 2-methylbutyl, tertiary pentyl, 1,2-dimethylpropyl, neopentyl, 1-methylpentyl, 2-methylpentyl, 1,1-dimethylbutyl, 1,2-dimethylbutyl, 1,3-dimethylbutyl, 2,2-dimethylbutyl, 1-ethylbutyl, 2-ethylbutyl, 2-ethylhexyl, 2,4,4-trimethylpentyl, and 1-ethyldecyl. Preferred are secondary butyl, tertiary butyl, and neopentyl.

The cycloalkyl often contains from about 6 to about 8 carbon atoms.

Examples of cycloalkyl groups include cyclohexyl, cycloheptyl, cyclooctyl, cyclodecyl, and cyclododecyl. Cyclohexyl is preferred.

The polycycloalkyl typically contains from about 7 to about 10 carbon atoms.

Examples of polycycloalkyl groups that may be used include 1-norbornyl, 2-bornyl, and 1-adamantyl.

Exemplary peroxy initiators include those described above in respect of the preparation of liquid aromatic-containing poly(allyl carbonate) polymer. Diisopropyl peroxydicarbonate and benzoyl peroxide are the preferred initiators.

Other examples of suitable peroxy initiators include monoperoxycarbonates represented by the following formula:

$$R_{10}-O-O-\underset{\underset{O}{\|}}{C}-O-R_{11} \quad (XXV)$$

wherein $R_{10}$ is a tertiary $C_4$-$C_5$ alkyl, e.g., tertiary butyl and tertiary amyl, and $R_{11}$ is a $C_3$-$C_7$ alkyl. Examples of alkyl radicals representative of $R_{11}$ include: isopropyl, n-propyl, isobutyl, secondary butyl, n-butyl, secondary amyl, isoamyl, n-amyl, secondary hexyl, isohexyl, n-hexyl, n-heptyl and 2,4-dimethyl-3-pentyl. Preferred as $R_{11}$ are secondary $C_3$-$C_7$ alkyls such as isopropyl, secondary butyl, and 2,4-dimethyl-3-pentyl. Particularly preferred monoperoxycarbonates are tertiary-butylperoxy isopropyl carbonate and tertiary-amylperoxy isopropyl carbonate.

The initiator may be admixed with the prepolymer-containing product composition to form a thermally polymerizable composition.

When used, the amount of initiator present in the prepolymer-containing composition may be widely varied. Ordinarily the composition comprises from about 0.5 to about 6 percent initiator by weight. In many cases the composition comprises from about 1 to about 5 percent initiator by weight. From about 2 to about 4 percent initiator by weight is preferred.

The temperatures at which polymerization is conducted may vary widely and depend primarily upon the initiator being used. Typically polymerization is conducted at temperatures in the range of from about 28° C. to about 120° C. Often the temperatures are in the range of from about 35° C. to about 115° C. From about 40° C. to about 110° C. is preferred.

A wide variety of cure cycles, that is, time-temperature sequences, may be used during polymerization. Ordinarily the cure cycle employed is based upon a consideration of several factors including the size of the coating, the identity of the initiator, and the reactivity of the ethylenically unsaturated material. For casting ophthalmic lenses or lens blanks, several standard cure cycles have been developed and these are shown in Tables 1-4. These standard cure cycles are useful in forming polymerizates but they are, however, only exemplary, and others may be used.

TABLE 1

Standard Cure Cycle for Diisopropyl Peroxydicarbonate

| Cumulative Hours | Oven Temperature, °C. |
|---|---|
| 0 | 44 |
| 2 | 46 |
| 4 | 48 |
| 6 | 50 |
| 8 | 54 |
| 10 | 58 |
| 12 | 64 |
| 14 | 69 |
| 16 | 85 |
| 17 | 105 (End of Cycle.) |

TABLE 2

Standard Eighteen Hour Cure Cycle for Benzoyl Peroxide

| Cumulative Hours | Oven Temperature, °C. |
|---|---|
| 0 | 63 |
| 2 | 63 |
| 4 | 65 |
| 6 | 67 |
| 8 | 77 |
| 10 | 80 |
| 12 | 85 |
| 14 | 88 |
| 16 | 92 |
| 18 | 100 (End of Cycle.) |

TABLE 3

Standard Five Hour Cure Cycle for Benzoyl Peroxide

| Cumulative Hours | Oven Temperature, °C. |
|---|---|
| 0 | 90 |
| 1 | 90 |
| 2 | 90 |
| 3 | 90 |
| 3.5 | 96 |
| 4 | 103 |
| 4.5 | 109 |
| 5 | 115 (End of Cycle) |

TABLE 4

Standard Cure Cycle for Tertiary-Butylperoxy Isopropyl Carbonate

| Cumulative Hours | Oven Temperature, °C. |
|---|---|
| 0 | 90 |
| 2 | 91 |
| 4 | 92 |
| 6 | 93 |
| 8 | 95 |
| 10 | 97 |
| 12 | 100 |
| 14 | 103 |
| 16 | 110 |
| 17 | 120 (End of Cycle.) |

In most cases, the pourable, polymerizable composition is conformed to the shape of the final solid polymerized article before polymerization. For example, the composition can be poured onto a flat surface and heated, whereby to effect polymerization and form a flat sheet or coating. According to a still further exemplification, the polymerizable composition is placed in molds, as for instance glass molds, and the molds heated to effect polymerization, thereby forming flat articles such as sheets or shaped articles such as curved sheets, lens blanks, or ophthalmic lenses. In a particularly preferred embodiment, the composition is poured into a lens mold or a lens blank mold and polymerized therein to produce an ophthalmic lens or an ophthalmic lens blank.

In many cases post curing, that is, heating beyond the time thought necessary to substantially fully polymerize the composition is employed. The post cure is often carried out above about 100° C., but below the temperatures at which thermal degredation provides undesirable yellowness, e.g., about 125° C., and preferably for a time sufficient to attain either substantially constant or maximum Barcol hardness. Typically post curing is carried out for from about 1 to about 4 hours, although greater or lesser times may be used as desired. Although not wishing to be bound by any theory, the additional 1 to 4 hours of post cure is believed to decompose, primarily by initiation and chain termination, from 83 percent to 99.9 percent of the peroxide initiator remaining unreacted at the end of the normal 18 hour cure cycle. Moreover, the additional 1 to 4 hours of cure often increases the Barcol Hardness by about 5 to 8 units.

The invention is further described in conjunction with the following examples which are to be considered illustrative rather than limiting.

EXAMPLE I

A three-neck, round bottom flask equipped with a thermometer, oxygen inlet tube, drying tube, and an electric heating mantle, was charged with about 1500 milliliters of diethylene glycol bis(allyl carbonate) monomer (CR-39 ®; PPG Industries, Inc.). The charged monomer was heated to 90° C. and maintained at that temperature for 5 hours while essentially pure commercial oxygen was introduced below the liquid level and allowed to bubble through the liquid thereby forming a first intermediate composition. The hydroperoxide content of the first intermediate composition was 1260.7 ppm.

A three-neck, round bottom flask equipped as above was charged with about 1500 milliliters of CR-39 ® diethylene glycol bis(allyl carbonate) monomer. The charged monomer was heated to 90° C. and maintained at that temperature for 4 hours while essentially pure commercial oxygen was introduced below the liquid level and allowed to bubble through the liquid thereby forming a second intermediate composition. The hydroperoxide content of the second intermediate composition was 932.5 ppm.

A three-neck, round bottom flask equipped as above was charged with about 1500 milliliters of CR-39 ® diethylene glycol bis(allyl carbonate) monomer. The charged monomer was heated to 90° C. and maintained at that temperature for 3½ hours while essentially pure commercial oxygen was introduced below the liquid level and allowed to bubble through the liquid thereby forming a third intermediate composition. The hydroperoxide content of the third intermediate composition was 709.0 ppm.

A composite intermediate composition was formed by admixing 710 grams of the first intermediate composition, 450 grams of the second intermediate composition, and 690 grams of the third intermediate composition. The hydroperoxide content of the composite intermediate composition was 972.7 ppm.

A five-neck, 500 milliliter round bottom flask equipped with a stirrer, thermometer, argon inlet tube, drying tube and electric heating mantle, was charged with 250 grams of the composite intermediate composition and 7.5 grams of methyl methacrylate. The charged materials were heated to 90° C. and maintained at that temperature for 16 hours while essentially pure commercial argon was introduced below the liquid level and allowed to bubble through the liquid to form as a product a polymerizable, liquid, substantially gel-free composition containing poly(allyl carbonate)-functional prepolymer. The product had an allylic utilization of 20.86 percent.

EXAMPLE II

About 50 milliliters of the composite intermediate composition of Example I was placed in a 150 milliliter beaker. The charged material was heated to and maintained at 130° C. with magnetic stirring. Periodically a sample of about 6 or 7 milliliter volume was removed by pipette. The sample was placed in a sample bottle which was then immediately chilled in ice water. The samples were analyzed for viscosity at 25° C. using a Brookfield viscometer and for allylic utilization. The times of sample withdrawals and the results are shown in Table 5.

TABLE 5

| Heating Time at 130° C., minutes, cumulative | Viscosity at 25° C., centipoises | Allylic Utilization, percent |
| --- | --- | --- |
| 0 | 17 | 4.0 |
| 15 | 39 | 10.71 |
| 30 | 81 | 14.94 |
| 45 | 194 | 18.40 |
| 53 | 364 | 20.11 |
| 60 | 773 | 21.35 |

The resulting product was a polymerizable, liquid, substantially gel-free composition containing poly(allyl carbonate)-functional prepolymer.

EXAMPLE III

A three neck, round bottom flask equipped as in Example I was charged with about 1600 milliliters of CR-39 ® diethylene glycol bis(allyl carbonate) monomer. The charged monomer was heated to 90° C. and maintained at that temperature for 5 hours while essentially pure commercial oxygen was introduced below the liquid level and allowed to bubble through the liquid thereby forming an intermediate composition. The hydroperoxide content of the intermediate composition was 1032.1 ppm.

A three neck, 100 milliliter round bottom flask equipped with a thermometer, argon inlet tube, drying tube, magnetic stirring bar, and an electric heating mantle was charged with about 80 milliliters of the intermediate composition. The charged material was heated to 130° C. and maintained at that temperature with magnetic stirring. Periodically a sample of about 15 milliliters was removed, bottled, chilled and analyzed in the manner of Example II. The times of sample withdrawals and the results are shown in Table 6.

TABLE 6

| Heating Time at 130° C., minutes, cumulative | Viscosity at 25° C., centipoises | Allylic Utilization, percent |
| --- | --- | --- |
| 20 | 50 | 10.9 |
| 40 | 149 | 14.8 |
| 60 | 1615 | 19.1 |

The resulting product was a polymerizable, liquid, substantially gel-free composition containing poly(allyl carbonate)-functional prepolymer.

EXAMPLE IV

A three neck, round bottom flask equipped as in Example I was charged with about 1200 milliliters of CR-39 ® diethylene glycol bis(allyl carbonate) monomer. The charged monomer was heated to 90° C. and maintained at that temperature for 16½ hours while essentially pure commercial oxygen was introduced below the liquid level and allowed to bubble through the liquid thereby forming an intermediate composition. The hydroperoxide content of the intermediate composition was 5316.9 ppm.

About 5 milliliters of the intermediate composition was placed in a 13 millimeter × 100 millimeter test tube. The test tube was immersed in a 130° C. oil bath for 9 minutes. The test tube was then withdrawn and chilled and the resulting product was bottled. Analysis of the product showed it to have an allylic utilization of 28.4 percent. The product was a polymerizable, liquid, substantially gel-free composition containing poly(allyl carbonate)-functional prepolymer. The polymer content of the product was 44 area percent, as determined by gel permeation chromatography.

Although the present invention has been described with reference to specific details of certain embodiments thereof, it is not intended that such details should be regarded as limitations upon the scope of the invention except insofar as they are included in the accompanying claims.

We claim:

1. A method comprising:
   (a) contacting a liquid monomer composition comprising at least one poly(allyl carbonate)-functional monomer, with molecular oxygen at a temperature of at least about 65° C. to produce a liquid intermediate composition having an increased hydroperoxide content of at least about 400 ppm, and
   (b) thereafter maintaining said intermediate composition at a temperature of at least about 100° C. to produce as a product a polymerizable, liquid, substantially gel-free composition which contains poly(allyl carbonate)-functional prepolymer and which has an allylic utilization of at least about 12 percent.

2. The method of claim 1 wherein the purity of said molecular oxygen is at least about 75 percent by volume.

3. The method of claim 1 wherein said molecular oxygen is in admixture with one or more non-reactive gases in a gas mixture.

4. The method of claim 1 wherein the temperature at which said monomer composition is contacted with said molecular oxygen is in the range of from about 70° C. to about 100° C.

5. The method of claim 1 wherein the temperature at which said monomer composition is contacted with said molecular oxygen is about 90° C.

6. The method of claim 1 wherein said intermediate composition is maintained at a temperature in the range of from about 100° C. to about 150° C. to produce said product.

7. The method of claim 1 wherein said intermediate composition is maintained at a temperature of about 130° C. to produce said product.

8. The method of claim 1 wherein said liquid poly(allyl carbonate)-functional monomer is represented by the formula:

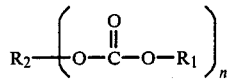

wherein $R_2$ is the organo group derived from polyhydroxy organic material, the average value of n is in the range of from about 2 to about 5, and $R_1$ is represented by the formula:

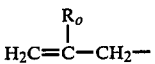

wherein $R_o$ is hydrogen, halo, or an alkyl group containing from 1 to about 4 carbon atoms.

9. The method of claim 1 wherein said liquid poly(allyl carbonate)-functional monomer is represented by the formula:

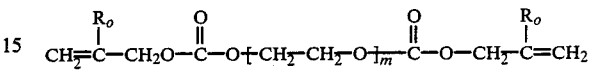

wherein $R_o$ is hydrogen and the average value of m is in the range of from about 1 to about 3.

10. The method of claim 1 wherein at least one additional ethylenically unsaturated monomer is admixed with said intermediate composition prior to producing said product.

11. The method of claim 10 wherein said additional ethylenically unsaturated monomer is an alkyl acrylate or an alkyl methacrylate.

12. The method of claim 10 wherein said additional ethylenically unsaturated monomer is methyl methacrylate.

13. The method of claim 1 wherein said intermediate composition is contacted with gas lean in molecular oxygen during at least a portion of the time said intermediate composition is maintained at said temperature to produce said product.

14. The method of claim 1 wherein said intermediate composition is contacted with gas which is essentially free of molecular oxygen during at least a portion of the time said intermediate composition is maintained at said temperature to produce said product.

15. The method of claim 14 wherein said gas is essentially helium, neon, argon, krypton, xenon, nitrogen, carbon dioxide, methane, ethane, propane, butane, or a mixture of two or more thereof.

16. The method of claim 14 wherein the temperature at which said monomer composition is contacted with said molecular oxygen is in the range of from about 70° C. to about 100° C. and wherein said intermediate composition is maintained at a temperature in the range of from about 100° C. to about 150° C. while being contacted with said gas which is essentially free of molecular oxygen.

17. The method of claim 14 wherein the temperature at which said monomer composition is contacted with molecular oxygen is about 90° C.

18. The method of claim 14 wherein said intermediate composition is maintained at a temperature of about 130° C. while being contacted with said gas which is essentially free of molecular oxygen.

* * * * *